US 6,598,397 B2

(12) United States Patent
Hanna et al.

(10) Patent No.: US 6,598,397 B2
(45) Date of Patent: Jul. 29, 2003

(54) INTEGRATED MICRO COMBINED HEAT AND POWER SYSTEM

(75) Inventors: William Thompson Hanna, Gahanna, OH (US); Donald Anson, Worthington, OH (US); George Henry Stickford, Jr., Dublin, OH (US); John Gordon Coll, Somerset, OH (US)

(73) Assignee: Energetix Micropower Limited, Manchester (GB)

( * ) Notice: Subject to any disclaimer, the term of this patent is extended or adjusted under 35 U.S.C. 154(b) by 0 days.

(21) Appl. No.: 09/998,705

(22) Filed: Nov. 30, 2001

(65) Prior Publication Data

US 2003/0029169 A1 Feb. 13, 2003

Related U.S. Application Data

(60) Provisional application No. 60/311,514, filed on Aug. 10, 2001.

(51) Int. Cl.⁷ ................................................ F01K 25/08
(52) U.S. Cl. .......................................... 60/651; 60/671
(58) Field of Search .......................... 60/651, 671, 616, 60/618

(56) References Cited

U.S. PATENT DOCUMENTS

| 4,010,378 | A | 3/1977 | Tharpe et al. | |
|---|---|---|---|---|
| 4,065,055 | A | 12/1977 | De Cosimo | |
| 4,510,756 | A | 4/1985 | Hise et al. | |
| 4,590,384 | A | 5/1986 | Bronicki | |
| 4,680,478 | A | 7/1987 | Wicks | |
| 4,715,192 | A | 12/1987 | Katz | |
| 4,738,111 | A | 4/1988 | Edwards | |
| 4,873,840 | A | 10/1989 | Gilliusson | |
| 4,920,276 | A | 4/1990 | Tateishi et al. | |
| 5,074,114 | A | 12/1991 | Meijer et al. | |
| 5,272,879 | A | 12/1993 | Wiggs | |
| 5,351,487 | A | 10/1994 | Abdelmalek | |
| 5,544,645 | A | 8/1996 | Armijo et al. | |
| 5,607,013 | A | 3/1997 | Inoue et al. | |
| 5,617,504 | A | 4/1997 | Sciacca et al. | |
| 5,640,842 | A | 6/1997 | Bronicki | |
| 5,704,209 | A | * | 1/1998 | Bronicki et al. ............ 60/650 |
| 5,799,490 | A | * | 9/1998 | Bronicki et al. ............ 60/655 |
| 5,903,060 | A | 5/1999 | Norton | |
| 5,918,805 | A | 7/1999 | Guyer | |
| 6,032,868 | A | 3/2000 | DiMarco | |
| 6,053,418 | A | 4/2000 | Guyer | |
| 6,073,857 | A | 6/2000 | Gordon et al. | |
| 6,107,693 | A | 8/2000 | Mongia et al. | |
| 6,141,953 | A | 11/2000 | Mongia et al. | |
| 6,230,480 | B1 | 5/2001 | Rollins, III | |
| 6,234,400 | B1 | 5/2001 | Guyer | |
| 6,240,718 | B1 | 6/2001 | Fetescu | |
| 6,290,142 | B1 | 9/2001 | Togawa et al. | |

FOREIGN PATENT DOCUMENTS

| DE | 19630058 A | 1/1998 |
|---|---|---|
| DE | 19843002 A | 3/2000 |
| DE | 2544179 A | 7/2001 |
| GB | 2294294 A | 4/1996 |
| WO | WO 0155561 A | 8/2001 |

* cited by examiner

Primary Examiner—Hoang Nguyen
(74) Attorney, Agent, or Firm—Killworth, Gottman, Hagan & Schaeff, LLP

(57) ABSTRACT

An integrated system to provide both heat and electric power. The integrated, or cogeneration, system operates with an organic working fluid that circulates in a Rankine-type cycle, where the organic working fluid is superheated by a heat source, expanded through an involute spiral wrap (scroll) expander such that the organic working fluid remains superheated through the expander, cooled in a condenser, and pressurized by a pump. Heat exchange loops within the system define hot water production capability for use in space heating and domestic hot water, while the generator is coupled to the scroll expander to generate electricity.

92 Claims, 8 Drawing Sheets

INTEGRATED MICRO COMBINED HEAT AND POWER SYSTEM

This application claims the benefit of U.S. Provisional Application No. 60/311,514 filed Aug. 10, 2001.

BACKGROUND OF THE INVENTION

The present invention generally relates to a cogeneration system for the supply of electrical power, space heating (SH) water and domestic hot water (DHW), and more particularly to a small scale Rankine-type cogeneration system that utilizes a scroll expander and an organic working fluid.

The concept of cogeneration, or combined heat and power (CHP), has been known for some time as a way to improve overall efficiency in energy production systems. With a typical CHP system, heat (usually in the form of hot air or water) and electricity are the two forms of energy that are generated. In such a system, the heat produced from a combustion process can drive an electric generator, as well as heat up water, often turning it into steam for dwelling or process heat. Most present-day CHP systems tend to be rather large, producing heat and power for either a vast number of consumers or large industrial concerns. Traditionally, the economies of scale have prevented such an approach from being extrapolated down to a single or discreet number of users. However, increases in fuel costs have diminished the benefits of centrally-generated power. Accordingly, there is a potentially great market where large numbers of relatively autonomous, distributed producers of heat and electricity can be utilized. For example, in older, existing heat transport infrastructure, where the presence of fluid-carrying pipes is pervasive, the inclusion of a system that can provide CHP would be especially promising, as no disturbance of the adjacent building structure to insert new piping is required. Similarly, a CHP system's inherent multifunction capability can reduce structural redundancy.

The market for localized heat generation capability in Europe and the United Kingdom (UK), as well as certain parts of the United States, dictates that a single unit for single-family residential and small commercial sites provide heat for both SH (such as a hydronic system with radiator), and DHW (such as a shower head or faucet in a sink or bathtub), via demand or instantaneous system. Existing combination units are sometimes used, where heat for DHW is accumulated in a combination storage tank and boiler coil. In one configuration, SH water circulates through the boiler coil, which acts as the heating element for the water in the storage tank. By way of example, since the storage capacity required for instantaneous DHW supplying one to two showers in a single family residence (such as a detached house or a large apartment) is approximately 120 to 180 liters (roughly 30 to 50 gallons), it follows that the size of the storage tank needs to be fairly large, sometimes prohibitively so to satisfy thermal requirements of up to 25 kilowatts thermal ($kW_t$) for stored hot water to meet such a peak shower demand. However, in newer and smaller homes there is often inadequate room to accommodate such storage tank volume. In addition to the need for instantaneous DHW capacity of up to 25 $kW_t$, up to 10 $kW_t$ for SH is seasonally needed to heat an average-sized dwelling.

Furthermore, even in systems that employ SH and DHW into a single heating system to consolidate spacing, no provision for CHP is included. In the example given above, it is likely that the electrical requirements concomitant with the use of 35 $kW_t$ will be between 3 and 5 kilowatts electric ($kW_e$). The traditional approach to providing both forms of power, as previously discussed, was to have a large central electricity generating station provide electricity on a common grid to thousands or even millions of users, with heat and hot water production capacity provided at or near the end-user on an individual or small group basis. Thus, with the traditional approach, the consumer has not only little control over the cost of power generation, as such cost is subject to prevailing rates and demand from other consumers, but also pays more due to the inherent inefficiency of a system that does not exploit the synergism of using otherwise waste heat to provide either additional electric generation or heating capacity.

Large-scale (in the megawatt (MW) range and up) cogeneration systems, while helpful in reducing the aforementioned inefficiencies of centrally-based power generation facilities, are not well-suited to providing small-scale (below a few hundred kW) heat and power, especially in the small-scale range of a few $kW_e$ and below (micro-based systems) to a few dozen $kW_e$ (mini-based systems). Much of this is due to the inability of the large prime mover systems to scale down, as reasonable electrical efficiency is often only achieved with varying load-responsive systems, tighter dimensional tolerances of key components and attendant high capital cost. Representative of this class are gas turbines, which are expensive to build for small-scale applications, and sacrifice efficiency when operating over varying electrical load requirements. Efficiency-enhancing devices, such as recuperators, tend to reduce heat available to the DHW or SH loops, thus limiting their use in high heat-to-power ratio (hereinafter Q/P) applications. A subclass of the gas turbine-based prime mover is the microturbine, which includes a high-speed generator coupled to power electronics, could be a feasible approach to small-scale cogeneration systems. Other shortcomings associated with large-scale CHP systems stem from life-limited configurations that have high maintenance costs. This class includes prime movers incorporating conventional internal combustion engines, where noise, exhaust emissions, lubricating oil and spark plug changes and related maintenance and packaging requirements render use within a residential or light commercial dwelling objectionable. This class of prime mover also does not reject a sufficient amount of heat for situations requiring a high Q/P, such as may be expected to be encountered in a single family dwelling. Other prime mover configurations, such as steam turbines, while generally conducive to high Q/P, are even less adapted to fluctuating electrical requirements than gas turbines. In addition, the steam-based approach typically involves slow system start-up, and high initial system cost, both militating against small-scale applications.

In view of the limitations of the existing art, the inventors of the present invention have discovered that what is needed is an autonomous system that integrates electric and heat production into an affordable, compact, efficient and distributed power generator.

BRIEF SUMMARY OF THE INVENTION

These needs are met by the present invention, where a new micro-CHP system is described. In micro-CHP, a compact prime mover can provide both electric output, such as from a generator coupled to a heat source, as well as heat output to provide warm air and hot water to dwellings. What distinguishes micro-CHP from traditional CHP is size: in the micro-CHP, electric output is fairly small, in the low $kW_e$ or even sub-$kW_e$ range. The system of the present invention can provide rapid response to DHW requirements, as the size of tanks needed to store water are greatly reduced, or possibly even eliminated. The size of the micro-CHP system described herein can be adapted to particular user needs; for example, a system for a single-family dwelling could be sized to produce approximately 3 to 5 $kW_e$, 10 $kW_t$ SH and 25 $kW_t$ DHW. For small commercial applications or multi-dwelling (such as a group of apartment units) use, the system could be scaled upwards accordingly. The heat to power ratio, Q/P, is an important parameter in configuring the system. For most residential and small commercial applications, a Q/P in the range of 7:1 to 11:1 is preferable, as ratios much lower than that could result in wasted electrical generation, and ratios much higher than that are not practical for all but the coldest climates (where the need for heating is more constant than seasonal). Since the production of electricity (through, for example, a generator or fuel cell) is a byproduct of the prime mover heat generation process, no additional carbon dioxide and related atmospheric pollutants are generated, thus making the system of the present invention amenable to stricter emission control requirements.

According to a first aspect of the present invention, a cogeneration system configured to operate with an organic working fluid is disclosed. The system includes a heat source, a first circuit configured to transport the organic working fluid, and a generator operatively coupled to a scroll expander to produce electricity. The first circuit includes a scroll expander configured to receive the organic working fluid, a condenser in fluid communication with the scroll expander, and a pump configured to circulate the organic working fluid. The first circuit is in thermal communication with the heat source such that heat transferred therefrom converts the organic working fluid to a superheated vapor. The use of organic working fluid, rather than a more readily-available fluid (such as water) is important where shipping and even some end uses could subject portions of the system to freezing (below 32° Fahrenheit). With a water-filled system, damage and inoperability could ensue after prolonged exposure to sub-freezing temperatures. In addition, by using an organic working fluid rather than water, corrosion issues germane to water in the presence of oxygen, and expander sizing or staging issues associated with low vapor density fluids, are avoided. The organic working fluid is preferably either a halocarbon refrigerant or a naturally-occurring hydrocarbon. Examples of the former include R-245fa, while examples of the latter include some of the alkanes, such as isopentane. Other known working fluids and refrigerants, despite exhibiting attractive thermodynamic properties, are precluded for other reasons. For example, R-11 is one of a class of refrigerants now banned in most of the world for environmental reasons. Similarly, R-123, much less environmentally objectionable (for now) than R-11, is the subject of decomposition concerns under certain micro-CHP operating conditions. The need to operate the condenser at a high enough temperature to allow useful hydronic space heating and the need to have a substantial vapor expansion ratio (of 5 to 7 or 8) limits the number of fluids with useful properties. In addition, the need to have a substantial vapor density at the expander inlet has a direct impact on the fluid choice and the diameter of the scrolls, both of which impact scroll cost. With many fluids, the condensing temperature and need for significant expansion result in very high scroll inlet pressures (increasing pumping power) or super critical conditions at the inlet, resulting in difficulties in evaporator design operation and control. These same conditions are of concern when one considers other natural (hydrocarbon) fluids. For example, while pentane, butane, and propane were all considered as potential working fluids, the inventors determined that, of the naturally-occurring hydrocarbons, isopentane offers superior fluid properties for micro-CHP applications.

According to another aspect of the present invention, a cogeneration system is disclosed. The cogeneration system includes an organic working fluid, a heat source capable of superheating the organic working fluid, a first circuit to transport the organic working fluid, and a generator to produce electricity. At least a portion of the first circuit, which includes a scroll expander, a condenser and a pump, is in thermal communication with the heat source. The pump circulates the organic working fluid through the first circuit. Preferably, the heat source is a burner in thermal communication with an evaporator such that heat provided by the burner causes the organic working fluid that flows through the evaporator to become superheated. In the present context, the term "thermal communication" is meant to broadly cover all instances of thermal interchange brought about as a result of coupling between system components, whereas the more narrow "heat exchange communication" (discussed below) is meant to cover the more specific relationship between direct, adjacent heat exchange components designed specifically for that purpose. By the nature of the organic working fluid, it remains in a superheated state from prior to entering the scroll expander to after it exits the same. The high vapor density and heat transfer properties of the superheated organic working fluid ensure that maximum heat and power can be extracted from the fluid without having to resort to a large expander.

The cogeneration system can be configured such that the organic working fluid is directly-fired or indirectly-fired. In the former configuration, the relationship between the burner and the organic working fluid-carrying evaporator is such that the flame from the combustion process in the burner directly impinges on either the conduit carrying the fluid or a container (alternately referred to as a combustion chamber) that houses at least a part of the organic working fluid-carrying conduit such that the part of the conduit where the organic working fluid becomes superheated is considered the evaporator. In the latter configuration, the flame from the combustion process in the burner gives up a portion of its heat to conduit making up a secondary circuit, which in turn conveys a heat exchange fluid to an interloop heat exchanger. The heat exchange fluid could be water, a mixture of water and a freeze-inhibiting additive (such as propylene glycol), or an organic, such as that of the organic working fluid of the first circuit. The first loop of the interloop heat exchanger is fluidly connected to the organic working fluid-conveying first circuit, while the second loop is fluidly connected to the heat exchange fluid-conveying second circuit. Preferably, the interloop heat exchanger is situated between the pump and the scroll expander of the first circuit so that it acts as an evaporator for the organic working fluid. The latter configuration may also include a space heating loop preheat device that is in heat exchange communication with the condenser second loop such that a portion of the heat still present in the heat exchange fluid after giving up a portion of its heat to the organic working fluid in the interloop heat exchanger can be used to preheat fluid in an external SH loop.

Also, as with the former configuration, the burner can be disposed within a container. In both configurations, the container may include an exhaust duct to carry away combustion products (primarily exhaust gas), an exhaust fan to further facilitate such product removal, as well as an exhaust gas heat exchanger disposed adjacent (preferably within) the exhaust duct so that residual heat present in the exhaust gas can be used for supplemental heating in other parts of the cogeneration system. The exhaust gas heat exchanger can further include an exhaust gas recirculation device to further improve heat transfer from the exhaust gas. In the former configuration, the heat picked up by the exhaust gas heat exchanger can be routed to various places within either the first circuit or the space heating loop to provide additional preheat of the organic working fluid or space heating fluid, respectively. In addition, either configuration may be adapted to exchange heat with an external DHW loop. The heat exchange may further take place in a heat exchanger configured similar to the condenser, such that two individual loops are placed adjacent one another to facilitate the transfer of heat between the respective fluids flowing therethrough, or in a storage tank (such as a hot water storage tank) such that the fluid stored therein (preferably water) is kept at an elevated temperature to have a readily-available supply of hot tap, bath and shower water. In the case of a storage tank-based approach, additional heating of the liquid in the tank can occur by a heating element that receives its power from the generator. Where no tank is present, the heat to the DHW loop can be taken from a connection to the first circuit condenser (in the directly-fired configuration) or the heat exchange fluid flowing through the second circuit (in the indirectly-fired configuration). Furthermore, in either of the directly-fired or indirectly-fired configurations, if it is desired to preserve the ability to provide DHW while maintaining an overall simplistic, low-cost system, an oversized or multiple-staged burner may be used. This prompt heating can reduce the size of or even obviate the need for a large storage tank while still capable of providing substantially "instant" hot water when required.

The operating conditions, including maximum temperature and pressure, of the cogeneration system's first circuit are configured to be within the design range of the organic working fluid. A controller can be incorporated to monitor and, if necessary, change operating parameters within the system. Switches, sensors and valves can be incorporated into the system to help the controller carry out its function. For example, to protect the expander from overspeeding during startup or shutdown transients, or low (or no) grid load, the controller can direct block and bypass valves to actuate, thereby forcing the superheated organic working fluid to bypass the expander. The controller may also integrate with user-determined conditions through the thermostat.

According to another aspect of the present invention, an indirectly-heated micro-CHP, including a heat source, first and second fluid circulating loops and an interloop heat exchanger, is disclosed. The indirectly-fired micro-CHP is advantageous in terms of system flexibility and maintainability. Multiple fluid-circulating loops are employed such that the heat source (for example, a burner) is provided to a second fluid circulating loop that is in thermal communication with, but fluidly isolated from, a first fluid circulating loop. The second fluid circulating loop includes piping used to convey a heat exchange fluid. This piping is preferably coiled and finned to maximize heat transfer between the heat source and the heat exchange fluid. At least one pump is used to circulate the heat exchange fluid. The second fluid circulating loop further contains a parallel set of sub-loops, one of which passes through a DHW heat exchanger to heat up municipal water, while the other passes through the interloop heat exchanger as an intermediary between the heat source and the organic working fluid flowing through the first fluid circulating loop. In addition to passing the organic working fluid through the interloop heat exchanger, the first fluid circulating loop includes a scroll expander connected to a generator, a SH heat exchanger, and a circulation pump. Upon the application of heat, the organic working fluid becomes superheated, then gets expanded in the scroll expander to turn the generator, thereby producing electrical power. The lower pressure, but still superheated organic working fluid leaving the scroll expander enters the SH heat exchanger, where another fluid, typically air or water, can be passed through and heated by the organic working fluid. This SH fluid is then circulated to radiators or similar space heating devices within a dwelling. The circulation pump returns the condensed organic working fluid to the interloop heat exchanger, where it can repeat the process.

Optionally, a preheat device for the SH loop can be placed in heat exchange communication with the second fluid circulating loop such that additional SH may be effected. In addition, as with the previous aspect, the heat source may include a burner disposed within a combustion chamber-type container. The container may include an exhaust duct, an exhaust fan, and an exhaust gas heat exchanger disposed adjacent the exhaust duct. The exhaust gas heat exchanger can further include an exhaust gas recirculation device to further improve heat transfer from the exhaust gas. Residual heat that would otherwise be vented out the duct and to the atmosphere can be captured and rerouted to other parts within the system. For example, the exhaust gas heat exchanger may be integrated into the first sub-loop of the second fluid circulating loop in order to provide additional heating to the DHW heat exchanger.

According to yet another aspect of the present invention, a directly-fired cogeneration system configured to circulate an organic working fluid is disclosed. The directy-fired micro-CHP is advantageous in terms of system cost and simplicity. The system includes a piping loop that defines an organic working fluid flow path, an organic working fluid disposed in the piping loop, an evaporator disposed in the organic working fluid flow path, a burner in thermal communication with the evaporator such that heat transferred to the evaporator superheats the organic working fluid, a scroll expander disposed in the organic working fluid flow path such that the superheated organic working fluid passing through the scroll expander remains superheated upon discharge from the scroll expander, a generator operatively responsive to the scroll expander to generate electricity, a condenser, and a pump disposed in the organic working fluid flow path between the condenser and the evaporator. The condenser comprises a primary loop disposed in the organic working fluid flow path such that the primary loop is in fluid communication with the scroll expander, and a secondary loop in heat exchange relationship with the primary loop, where the secondary loop is configured to transfer at least a portion of the heat contained in the organic working fluid passing through the primary loop to an external loop, such as a space heating device.

Optionally, the directly-fired micro-CHP system includes a controller, valves, combustion chamber and exhaust features similar to that of the previous aspects. Also, as with the previous aspects, the organic working fluid is preferably either a naturally occurring hydrocarbon (such as isopentane) or a halocarbon refrigerant, such as R-245fa. In addition, the heat source, which can be a burner, may be oversized to provide additional heat in variations of the system that do not employ a storage tank for DHW purposes. In this situation, the burner can be either larger, or a multi-staged device such that each stage is dedicated to a particular part of the external heating circuits, such as the SH or DHW circuits. Furthermore, the external heating circuits can be coupled to the cogeneration system from a single connection on the condenser such that bifurcated paths corresponding to the SH and DHW loops can both be accommodated.

According to still another aspect of the present invention, a micro combined heat and power system is disclosed. The micro combined heat and power system comprises an electricity generating loop and a connection to an external heating loop. The electricity generating loop includes a burner for raising the temperature of the organic working fluid such that the organic working fluid becomes superheated, a scroll expander to receive the superheated vapor such that the working fluid remains in a superheated state after passing therethrough, a generator operatively coupled to the scroll expander to produce electricity, a condenser disposed in fluid communication with the scroll expander and a pump to circulate the organic working fluid. The connection is disposed in the condenser, and is configured to place the external heating loop in thermal communication with the condenser. This external heating loop can be either a DHW loop, an SH loop, or both. As with the previous aspects of the invention, similar controller, combustion chamber and related features may be incorporated.

According to an additional aspect of the present invention, a system for the production of domestic hot water, space heat and electricity from a Rankine-based cycle with an organic working fluid is disclosed. The system includes a substantially closed circuit fluid path configured to transport the organic working fluid therethrough, a burner configured to provide sufficient heat to superheat the organic working fluid, and a controller to regulate the operation of the system. The substantially closed circuit fluid path is at least partially defined by a coiled conduit configured to act as a heat transfer element for the organic working fluid, and includes as components a scroll expander, a generator, a condenser and a pump. The term "tube" can be used interchangeably with "conduit", as both describe a closed hollow vessel used for the transport of fluids. The burner is in thermal communication with the substantially closed circuit fluid path's coiled tube. The scroll expander is configured to accept the superheated organic working fluid. The condenser is configured to extract at least a portion of the heat remaining in the organic working fluid after the organic working fluid passes through the scroll expander. The pump pressurizes and circulates the organic working fluid.

According to yet an additional aspect of the present invention, an indirectly-fired cogeneration system comprising a heat source, a passive heat transfer element in thermal communication with the heat source, a first circuit, a generator and a second circuit is disclosed. The first circuit is configured to transport an organic working fluid, and is disposed adjacent an end of the passive heat transfer element such that heat transferred from the passive heat transfer element increases the energy content of the organic working fluid. The first circuit is made up of at least a scroll expander configured to receive the organic working fluid, a condenser in fluid communication with the scroll expander, and a pump configured to circulate the organic working fluid. The condenser is configured to transfer at least a portion of the excess heat contained in the organic working fluid to an external heating loop. As with the previous aspects, the generator is coupled to the scroll expander to produce electricity in response to motion imparted to it from the scroll. The second circuit is configured to transport a heat exchange fluid therethrough, and is disposed adjacent an end of the passive heat transfer element such that heat transferred therefrom increases the energy content of the heat exchange fluid. The second circuit is made up of at least a combustion chamber disposed adjacent the heat source such that exhaust gas can be removed. Details relating to the combustion chamber are similar to those discussed in conjunction with the previous aspects, with the exception that one end of the passive heat transfer element (which is preferably a heat pipe) is disposed inside the combustion chamber so that such end absorbs heat from the heat source.

According to still another aspect of the present invention, a cogeneration system comprising a heat source, a passive heat transfer element in thermal communication with the heat source, and a first circuit is disclosed. The first circuit is configured to transport an organic working fluid, and is disposed adjacent an end of the passive heat transfer element such that heat transferred from the passive heat transfer element superheats the organic working fluid. The first circuit is made up of at least a scroll expander configured to receive the organic working fluid, a condenser in fluid communication with the scroll expander, and a pump configured to circulate the organic working fluid. A generator is coupled to the scroll expander to generate electricity in response to the expansion of the organic working fluid in the scroll. The condenser is configured to transfer at least a portion of the excess heat contained in the organic working fluid to an external heating loop. As with the previous aspect, the passive heat transfer element is preferably a heat pipe, and its integration into the combustion chamber is similar.

According to another aspect of the present invention, a method of producing heat and electrical power from a cogeneration device is disclosed. The method includes the steps of configuring a first circuit to transport an organic working fluid, superheating the organic working fluid with a heat source that is in thermal communication with the first circuit, expanding the superheated organic working fluid in a scroll expander, turning a generator that is coupled to the scroll expander to generate electricity, cooling the organic working fluid in a condenser such that at least a portion of the heat in the organic working fluid passing through the condenser is transferred to an external heating loop, using at least a portion of the heat that has been transferred to the external heating loop heat to provide space heat, and returning the organic working fluid exiting the condenser to a position in the first circuit such that it can receive additional heat input from the heat source.

Optionally, the method includes maintaining the organic working fluid in a superheated state through the expanding step. As an additional step, the method can selectively use at least a portion of the heat that has been transferred to the external heating loop to heat a domestic hot water loop. An alternative set of steps can be used to configure a second circuit to transport a heat exchange fluid to a DHW loop where the DHW loop is decoupled from the SH loop that is thermally coupled to the condenser. The second circuit is defined by a piping loop flow path that is in thermal communication with the heat source. The second circuit is in heat exchange communication with at least one domestic hot water loop, such as a heat exchanger or a water storage tank, for example. The second circuit is configured such that at least a portion of the heat that has been transferred to the heat exchange fluid will go to heat a fluid (such as water) in the domestic hot water loop. Preferably, the organic working fluid is superheated to about 10 to 30 degrees Fahrenheit above its boiling point in the superheating step, and is pressurized to a maximum pressure of about 200 to 450 pounds per square inch in the returning (pumping) step. In addition, the superheating step produces a maximum temperature of between about 250–350 degrees Fahrenheit in the organic working fluid. Moreover, the expanding step is conducted such that the electrical output of the generator is up to 10 kilowatts, while the cooling step is conducted such that the thermal output transferred to the external heating loop is up to 60 kilowatts. The heat source can either directly or indirectly fire the organic working fluid. An additional step may further include operating a set of valves configured to permit the organic working fluid to bypass the scroll expander upon a preset condition, which can be a grid outage, startup transient or shutdown transient.

According to another aspect of the present invention, a system for the production of electricity and space heat through the expansion of an organic working fluid in a superheated state is disclosed. The system comprises an organic working fluid, a flow path configured to transport the organic working fluid, a combustion chamber disposed in the flow path, a scroll expander disposed in the flow path to receive and discharge the organic working fluid in the superheated state, a generator operatively coupled to the scroll expander to produce electricity, a condenser in fluid communication with the scroll expander, and a pump to circulate the organic working fluid through the flow path. The combustion chamber comprises a burner, a heat transfer element adapted to convey the organic working fluid adjacent the burner, and an exhaust duct to convey combustion products produced by the burner to the atmosphere. As with previous aspects, coupling between the condenser and an external heating loop can be used to effect heat exchange with an SH loop. In addition, system regulating devices, such as a controller, switches and valves may be employed, as can additional heat exchange devices that couple to the exhaust duct or the condenser, also discussed in conjunction with the previous aspects.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
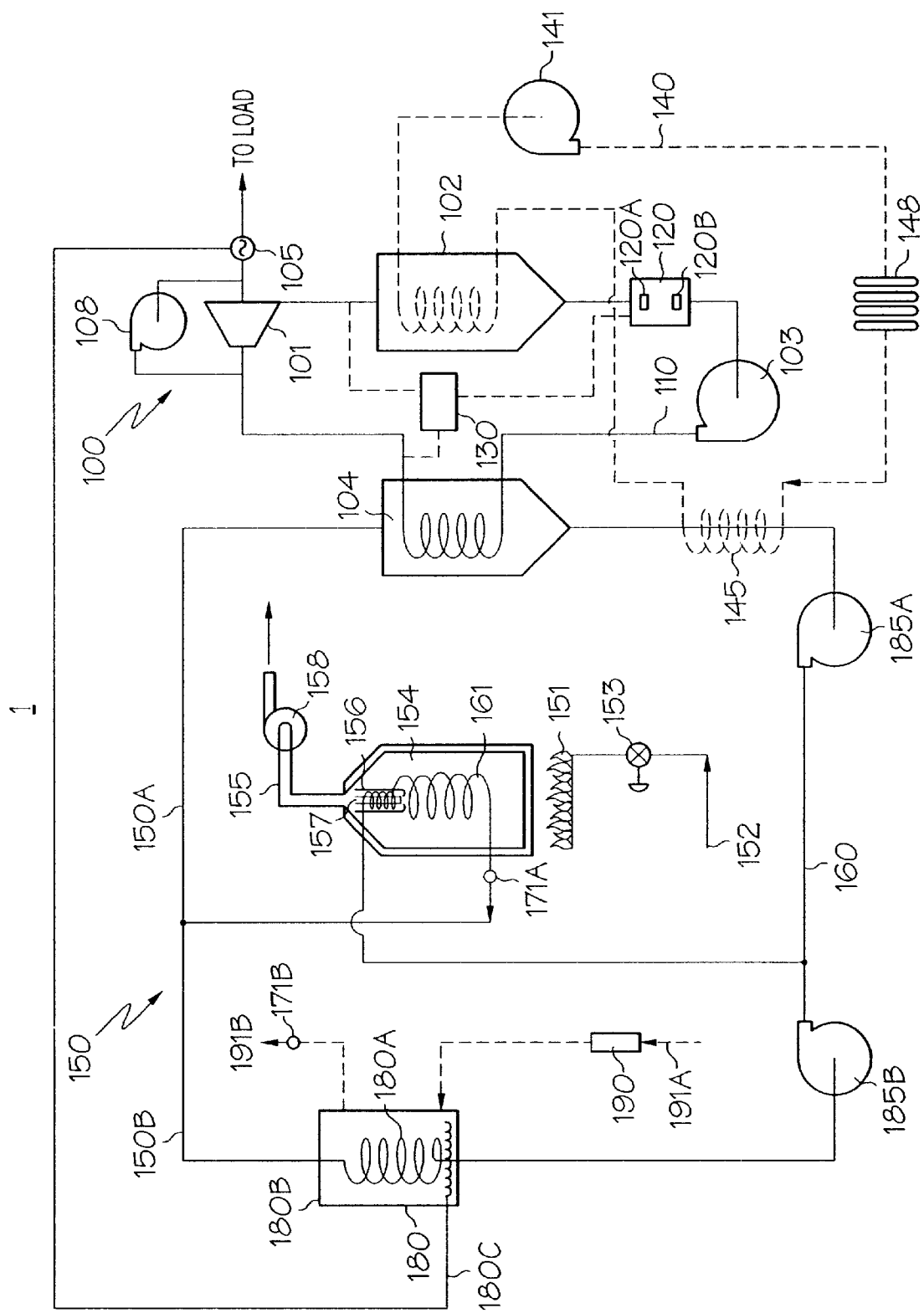
FIG. 1 shows a schematic diagram of an integrated micro-CHP system according to an embodiment of the present invention showing an indirectly-fired configuration with a storage tank and both SH and DHW capability.

Referring initially to FIG. 1, one embodiment of the micro-CHP system 1 is an indirectly-heated, dual-loop system that includes a first (or primary) circuit 100 and a second circuit 150. An advantage of the indirectly fired system is that first circuit boiler (or evaporator) conduit overheating and subsequent burn-out is avoided. First circuit 100 includes a expander 101, a condenser 102, a pump 103 and one portion of interloop heat exchanger 104. An organic working fluid (such as naturally-occurring hydrocarbons or halocarbon refrigerants, not shown) circulates through the loop defined by the fluidly-connected expander 101, condenser 102, pump 103 and interloop heat exchanger 104. Piping 110 is used to connect the various components of first circuit 100, whereas the pump 103 provides the pressure to supply the organic working fluid to the interloop heat exchanger 104, thereby completing the first circuit 100. A generator 105 (preferably induction type) is coupled to expander 101 such that motion imparted to it by expander 101 generates electricity. While the expander 101 can be any type, it is preferable that it be a scroll device. The scroll expander can be a conventional single scroll device, as is known in the art. An oil pump 108 is used to provide lubricant to the scroll. The presence of oil helps to establish a seal between the intermeshed stationary and orbiting wraps that make up the scroll's crescent-shaped chambers (not shown). A level indicator switch 120 with level high 120A and level low 120B indicators is placed at the discharge of condenser 103. Controller 130 is used to regulate system operation. It senses parameters, such as organic working fluid temperatures, at various points within the first circuit and level information taken from the level indicator switch 120. Through appropriate program logic, it can be used to open and close valves (not presently shown) in response to predetermined conditions, such as an electric grid outage. The generator 105 is preferably an asynchronous device, thereby promoting simple, low-cost operation of the system 1, as complex generator speed controls and related grid interconnections are not required. An asynchronous generator always supplies maximum possible power without controls, as its torque requirement increases rapidly when generator 105 exceeds system frequency. The generator 105 can be designed to provide commercial frequency power, 50 or 60 Hz, while staying within close approximation (often 150 or fewer revolutions per minute (rpm)) of synchronous speed (3000 or 3600 rpm).

An external heating loop 140 (shown preferably as an SH loop) can be coupled to first circuit 100 via connectors (not shown) on condenser 102. As an option, a preheat coil 145 can be inserted into the external heating loop 140 such that the hydronic fluid (typically water) flowing therethrough can receive an additional temperature increase by virtue of its heat exchange relationship with heat exchange fluid flowing through second circuit 150 (discussed in more detail below). The hydronic fluid flowing through external heating loop 140, is circulated with a conventional pump 141, and is supplied as space heat via radiator 148 or related device. As an example, hydronic fluid could exit the condenser 102 at about 50° Celsius and return to it as low as 30° Celsius. The capacity of the system 1 is up to 60 kW$_t$; however, it is within the scope of the present invention that larger or smaller capacity units could be utilized as needed. Inherent in a micro-CHP (cogeneration) system is the ability to provide heat in addition to electricity. Excess heat, from both the heat source and the expanded working fluid, can be transferred to external DHW and SH loops. The nature of the heat exchange process is preferably through either counter-flow heat exchangers (for either or both the DHW and SH loops), or through a conventional hot water storage tank (for a DHW loop). It will be appreciated by those of ordinary skill in the art that while the embodiments depicted in the figures show DHW and SH heat exchangers in parallel (and in some circumstances being supplied from the same heat exchange device, shown later), it is within the spirit of the present disclosure that series or sequential heat exchange configurations could be used.

Second circuit 150 includes two parallel sub-loops 150A, 150B. Heat to the two parallel sub-loops 150A, 150B is provided by a burner 151, which is supplied with fuel by a gas train 152 and variable flow gas valve 153. Piping 160 (which makes up the parallel sub-loops) passes through a combustion chamber 154, which is where the heat from the combustion of fuel at burner 151 is given up to the heat exchange fluid (not shown) that flows through piping 160. Piping 160, which includes a finned tube portion 161 disposed inside the combustion chamber 154, branches out into the first parallel sub-loop 150A, which transports the heat exchange fluid that has been heated in combustion chamber 154 to interloop heat exchanger 104 in order to give up the heat to organic working fluid flowing through first circuit 100. Block valves (not shown) could be used to regulate flow between the sub-loops; however, by idling the pump of the inactive sub-loop, significant flow in that sub-loop is prevented without the need for additional valving. The second parallel sub-loop 150B transports the heat exchange fluid to DHW heat exchanger 180 in order to heat up domestic hot water. One side of domestic hot water heat exchanger 180 (which can be a water storage tank) includes coil 180A configured to transport the heat exchange fluid, and another side, the shell 180B, to transport domestic hot water (not shown) from a cold water inlet 191A, past coil 180A and to DHW outlet 191B. Typically, the cold water comes from either a well or a city/municipal water supply. Similarly, temperature sensor 171B can detect the temperature of the DHW coming out of the DHW heat exchanger 180. This sensor can also be linked to a controller 130 (discussed in more detail below). Combustion chamber 154 includes an exhaust duct 155, an exhaust gas recirculation device 156 with exhaust duct heat exchanger 157, and fan 158. It will be appreciated by those skilled in the art that although the fan 158 is preferably shown as an induced-draft fan, it could also be a forced-draft fan, if properly located relative to the combustion chamber 154. Temperature sensor 171A is placed at the combustion chamber 154 outlet for the second circuit 150 to measure the temperature conditions of the heat exchange fluid, in a manner similar to that of temperature sensor 171B. Second circuit pumps 185A, 185B are used to circulate heat exchange fluid through the second circuit 150, with pump 185B circulating heat exchange fluid through DHW heater 180 and pump 185A circulating heat exchange fluid through interloop heat exchanger 104. The exhaust duct heat exchanger 157 and an exhaust gas recirculation (EGR) device 156 accept hot exhaust gas from the burner 151 and recirculate it in an internal heat exchange process, thereby lowering the temperature of the exhaust gas that is pulled away and vented to the atmosphere by fan 158. The heat given up by the exhaust gas in the exhaust gas heat exchanger 157 is used to provide additional heat to other parts of the system 1. In the present figure, this additional heat is used to increase the temperature of the heat exchange fluid flowing in second circuit 150.

A controller 130, which could be a programmable logic controller (PLC) or conventional microcomputer (not shown), can be used to provide detailed system control. All of the pumps can be configured to be variable-speed, and are responsive to input signals from controller 130. Upon receipt of a signal for heat, the burner 151 ignites the fuel, while the proper circulating pump 185B or 185A is energized. For DHW, flow switch 190, in conjunction with temperature sensor 171B, provide inputs to controller 130. Flow switch 190 selects DHW mode, where the DHW set point is coupled to temperature sensor 171A. The burner gas flow and DHW pump 185B flow are regulated to provide the desired temperature at 171B according to the temperature preset by the user on the DHW thermostat (not shown).

When the system is operating, heated heat exchange fluid is moving past sensor 171A, which is able to provide a valid signal to the controller 130 so the burner 151 firing rate and pump 185B flow can be adjusted for both safe operation and the needed output. However, when the system is just starting, the controller 130 must be given some initialized state which can be used as a safe operating condition until such time as heat exchange fluid is flowing past temperature sensor 171A. It is desirable to have a minimum amount of heat exchange fluid flow during startup, so that the fluid heats up as rapidly as possible. However, some flow is needed to prevent local overheating of the fluid in the combustion chamber 154, and to provide the controller 130 with an indication that the burner 151 is indeed firing. The gas rate is set to provide the longest possible run time for the system, consistent with measured outdoor temperature and rate of change of indoor temperature. Pump 185B operates to keep the combustion chamber 154 supplied with the heat exchange fluid at the factory-preset value for temperature sensor 171A. When temperature sensor 171A gets to about 50% of the thermostat set point, the pump 185B speed is increased until the temperature reading in temperature sensor 171A reaches its set point, at which time the burner 151 and pump 185B modulate for constant values of temperature sensors 171A and 171B. When the flow switch 190 indicates zero flow, the burner 151 and pump 185B cease operation. A small expansion tank (not shown) can be placed in the second circuit 150 to allow for differential thermal expansion at moderately high pressures of the heat exchange fluid.

When the user desires heat, as indicated by the room thermostat (not shown) the burner 151 comes on to about 50% of its capacity to warm up system 1. Pump 185A comes on to a speed predetermined to coincide with the flow requirements established by the initial burner firing rate and the design response of the system. The controller 130 responds to the user demand for heat, and the owner selected set point for room temperature. Burner 151 firing and pump 185A flow are controlled in part, and conventionally by room temperature and its set point, as well as outdoor temperature (sensor not shown). The first circuit pump 103 runs fast enough to keep the organic working fluid liquid level between level low 120B and level high 120A switch settings. The controller 130 instructs the pump 103 to start or speed up when the organic working fluid liquid level rises above the level 120A, and stopping when the level goes below level 120B, for example.

Figure 8:
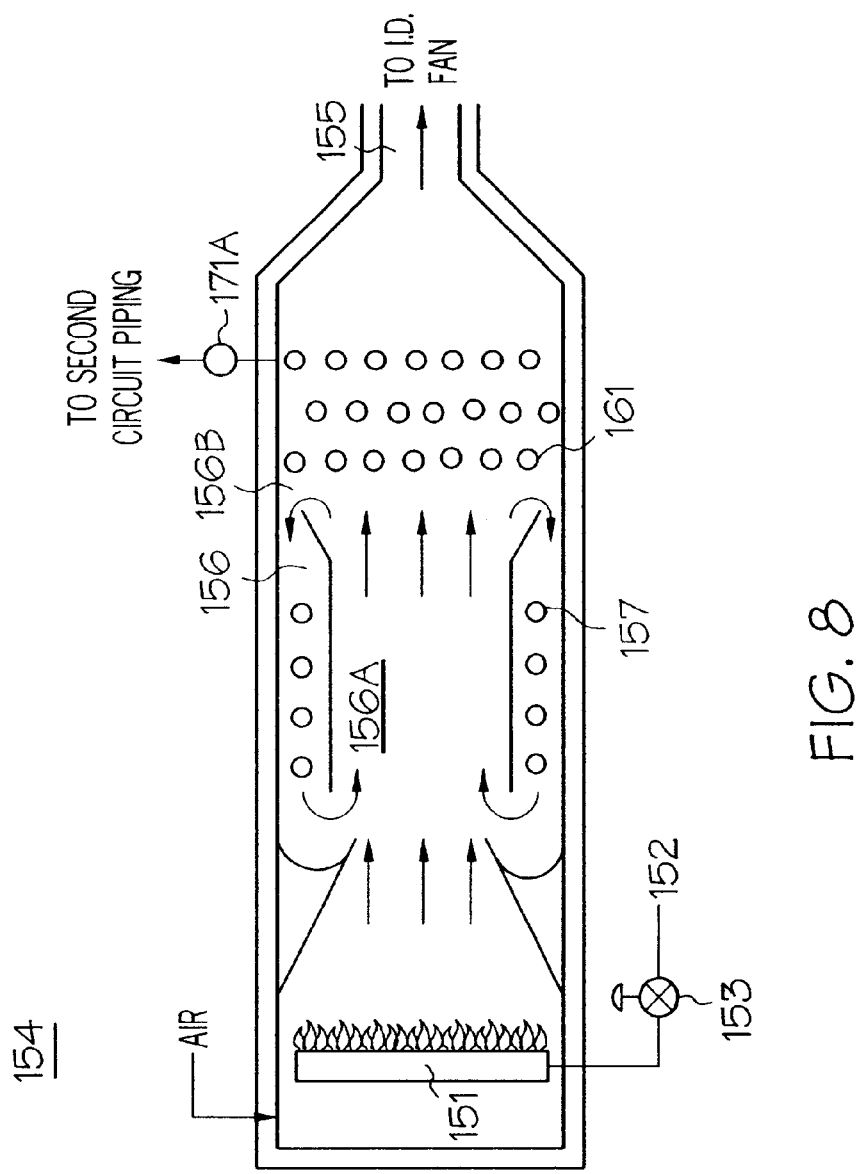
FIG. 8 shows the details of an exhaust gas heat exchanger, including details of an exhaust gas recirculation device.

The length of finned tube portion 161 of piping 160 that is inside the combustor 154 can be minimized by carefully selecting pumps, control points, and conduit size. Referring now to FIG. 8 in conjunction with FIG. 1, details of the EGR device 156 for micro-CHP system 1 is shown. In essence, the EGR device 156 functions in conjunction with the exhaust duct 155 and is an integral part of exhaust gas heat exchanger 157. The hot exhaust gas stream is directed axially through EGR device 156, which is preferably placed between burner 151 and exhaust duct 155. An annular recirculation duct 156B, passes some of the exhaust gas in a counterflow fashion until it is reinjected at inlet 156A. The walls of the EGR device 156 are cooled by the heat exchange fluid that passes through the duct heat exchanger 157, and as a result, the recirculation gas entering at inlet plane 156A is partially cooled. This tempered gas stream leaving at plane 156B enters the second heat transfer section defined by finned tube portion 161 of second circuit piping (not presently shown), in which additional cooling of the gas occurs. In a more compact arrangement, the inner annular duct of the EGR device 156 would be replaced by an array of fine tubes (not shown), each having a flow inducer for hot gas at the inlet end. While such an approach would involve the use of a larger amount of fluid, which would increase the response time of the system, significant benefits could be realized, including the application of the EGR device 156 to an evaporator where an organic working fluid is used such that the fluid is never exposed to the full temperature of the exhaust gas, and the final heat recovery is not reduced by any form of added flue gas dilution, especially cool air. The primary benefit of the EGR device 156 is that levels of harmful gaseous by-products (such as $NO_x$) are reduced. An additional benefit of the EGR device is that by reducing the highest temperature that the finned tube portion 161 is exposed to, simpler components that will have lower cost yet which can attain the same long life of more costly materials can be used.

Figure 2:
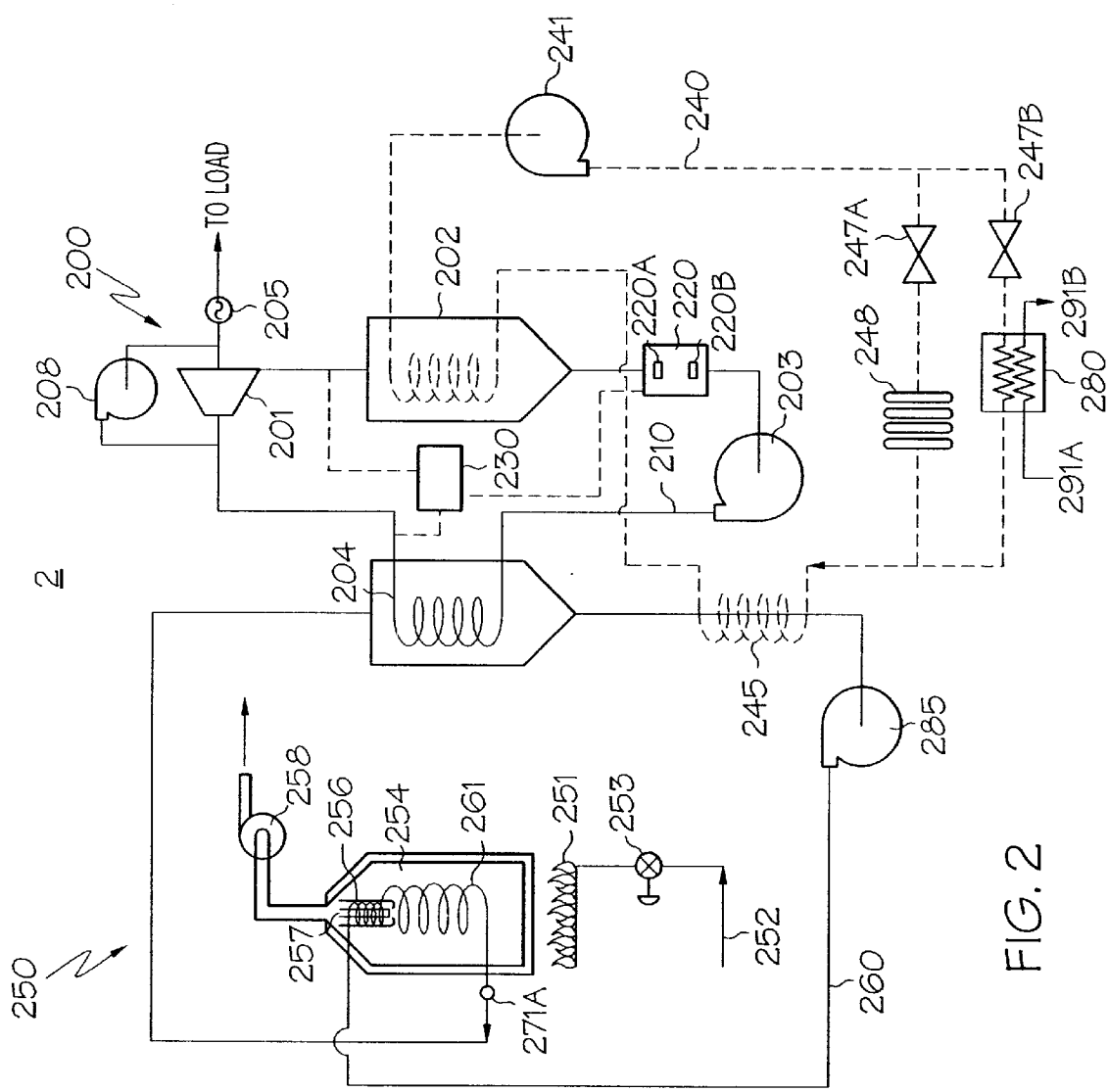
FIG. 2 shows a schematic diagram of an integrated micro-CHP showing an indirectly-fired configuration with no storage tank and both SH and DHW capability.

Referring next to FIG. 2, an alternate embodiment of the indirectly-fired micro-CHP system 2 is shown. Here, the second circuit 250 does not encompass parallel sub-loops. Instead, a single loop is routed directly from combustion chamber 254 to interloop heat exchanger 204. DHW capability, which was provided by second sub-loop 150B in the embodiment shown in FIG. 1, is now integrated into the external heating loop 240. This external loop, that services both DHW and SH, can be bifurcated after coupling to the condenser 202, with valves 247A, 247 B operating to supply SH radiators 248 or DHW heat exchanger 280 as needed. DHW heat exchanger 280 can be either a water tank to store hot water (as discussed in conjunction with the previous aspect), or a dual-pass counterflow heat exchange device. After the fluid (typically water) passes through either or both SH and DHW heat exchangers, it is circulated through heating loop 240 back to the condenser 202 to start its cycle again. Prior to entry into the condenser 202, the fluid can be preheated by passing it thermally adjacent second circuit 250 in a preheat device 245.

Figure 3:
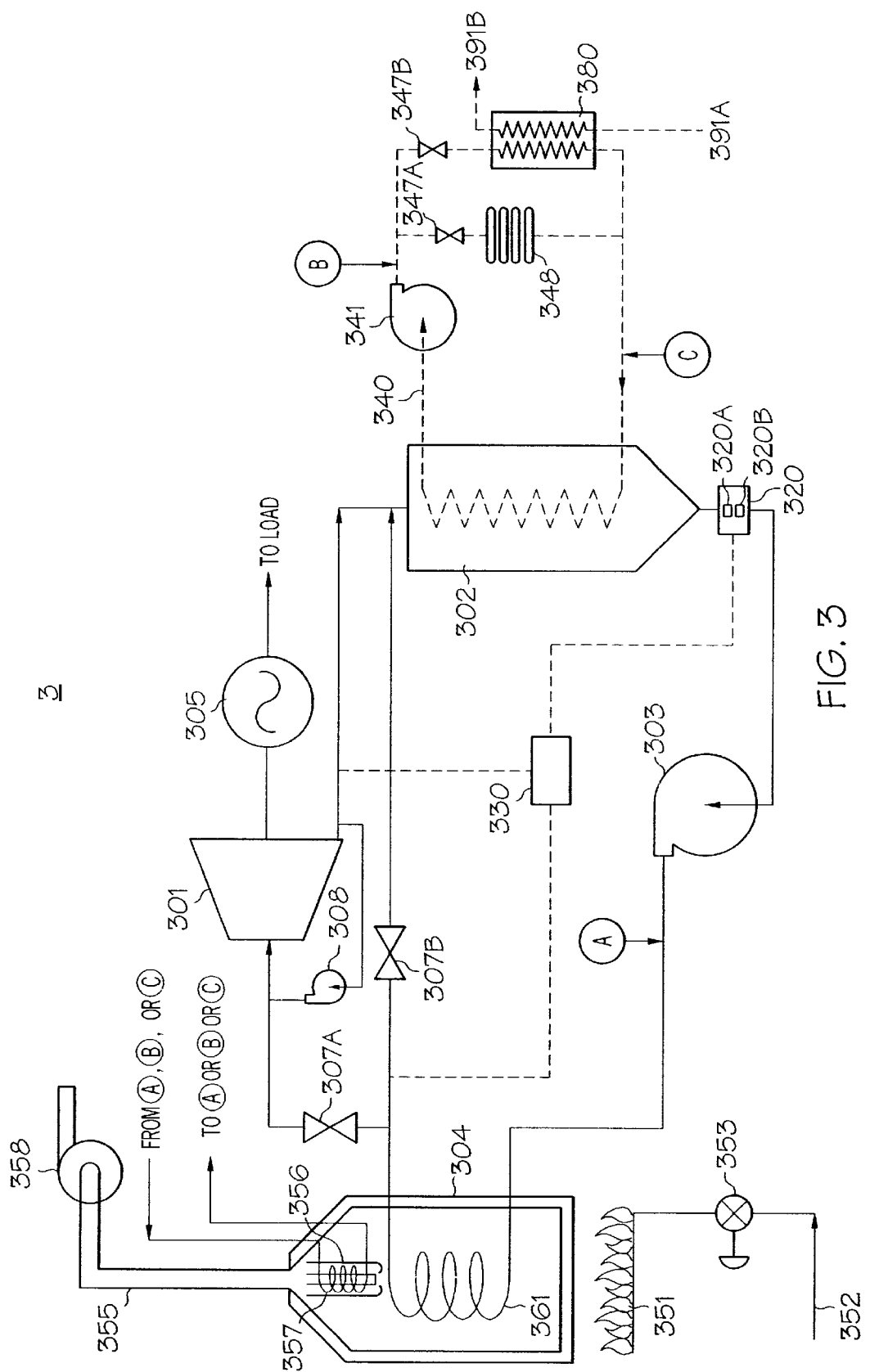
FIG. 3 shows a schematic diagram of an integrated micro-CHP showing a directly-fired configuration with no storage tank and both SH and DHW capability.
Figure 4:
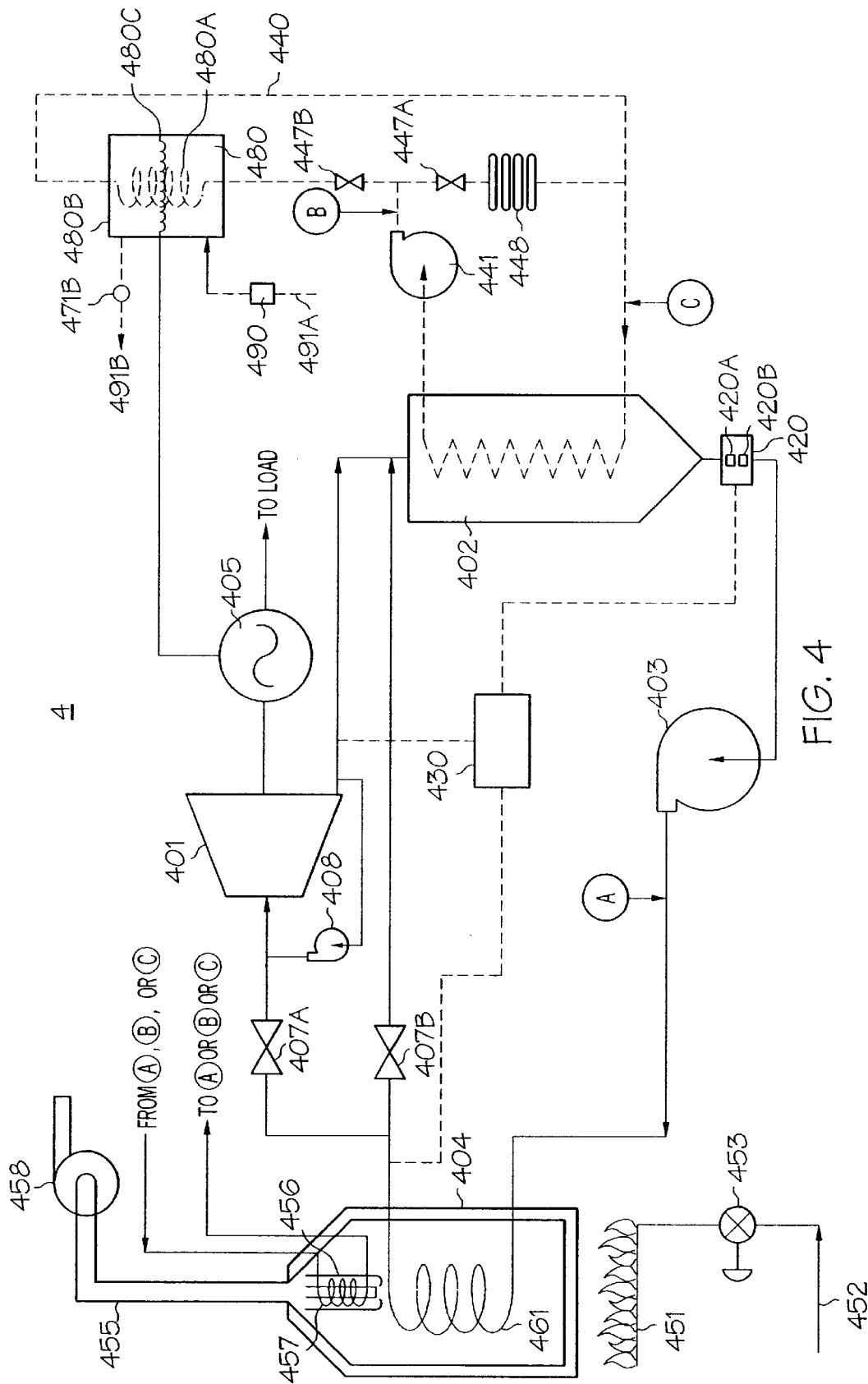
FIG. 4 shows a schematic diagram of an integrated micro-CHP showing a directly-fired configuration with a storage tank and both SH and DHW capability.

Referring now to FIGS. 3 and 4, a directly-fired micro-CHP system is shown. This system has the advantage of being simpler in construction, with attendant lower cost. In the present embodiment, the system 3 does not include a second circuit. The interloop heat exchanger of the previous embodiments, which acted as the heat source for the previous embodiment first circuits, is replaced by a combustion chamber 304, where both the burning of fuel, through gas train 352, valve 353 and burner 351, and the evaporation of the organic working fluid takes place. As with the previous embodiments, the organic working fluid is superheated. Generator 305, as with the previous embodiments, is asynchronously tied to a load, preferably on the customer/user side of the electric meter, which is typically the power grid. The load on the scroll expander 301 imposed by the grid ensures that mechanical speeds in the scroll 301 are kept within its structural limits. Block valve 307A and bypass valve 307B are situated in the organic working fluid flow path defined by piping 310 (of which conduit 361 is part). These valves respond to a signal in controller 330 that would indicate if no load (such as a grid outage) were on the system, allowing the superheated vapor to bypass around the expander, thereby avoiding overspeed of scroll 301. In this condition, the rerouted superheated vapor is fed into the inlet of condenser 302. Under normal operating conditions, where there is a load on the system, the superheated vapor enters the scroll expander 301, causing the orbiting involute spiral wrap to move relative to the intermeshed fixed involute spiral wrap. As the superheated vapor expands through the increasing volume crescent-shaped chambers, the motion it induces in the orbiting wrap is transferred to the generator 305, via a coupled shaft or an integral rotor/stator combination on the scroll 301. Depending on the type of oil used in the system (such as whether the oil is miscible or immiscible with regard to the organic working fluid), scroll 301 may preferably include an oil pump 308 to circulate oil present in the scroll from the superheated vapor. The workings of the exhaust duct 355 and fan 358 are similar to that of the previous aspect; however, the present EGR device 356 and exhaust duct heat exchanger 357, rather than providing additional heat to a heat exchange fluid flowing through the second circuit 150, 250 of the previous embodiments, can be used to provide supplemental heat to various locations within the system 3. For example, additional heat can be added to the organic working fluid coming out of pump 385, shown at point A. Similarly, it can be used to add heat to the external heating loop 340 at points B or C. Precise location of the heat exchange points A, B or C would be determined by the nature of the organic working fluid and its properties. Note that DHW heat exchanger 380 can be configured as a conventional dual-pass counterflow heat exchanger, or as a water storage tank, as discussed in the previous aspects. In situations where no (or a small) storage tank is being used (such as, for example, when space is at a premium), then in order to provide fast-responding DHW, additional heat generation may be required. One approach is to use a larger or multiple-stage burner (not shown). This could provide rapid response times to the instant or near-instant demands associated with DHW uses (such as showers, baths and hot tap water). Referring with particularity to FIG. 4, a variation on the directly-fired micro-CHP of FIG. 3 is shown. In this case, the system 4 specifically includes a storage tank 480. This approach allows the inclusion of DHW capability without having to resort to increased burner capacity. In addition, power to a storage tank heating element 480C can be provided directly off generator 405. In addition, trade-offs between the size of the storage tank 480 and the size or number of burner 451 can be made to best suit the functionality and packaging/volume requirements of the system.

Figure 5:
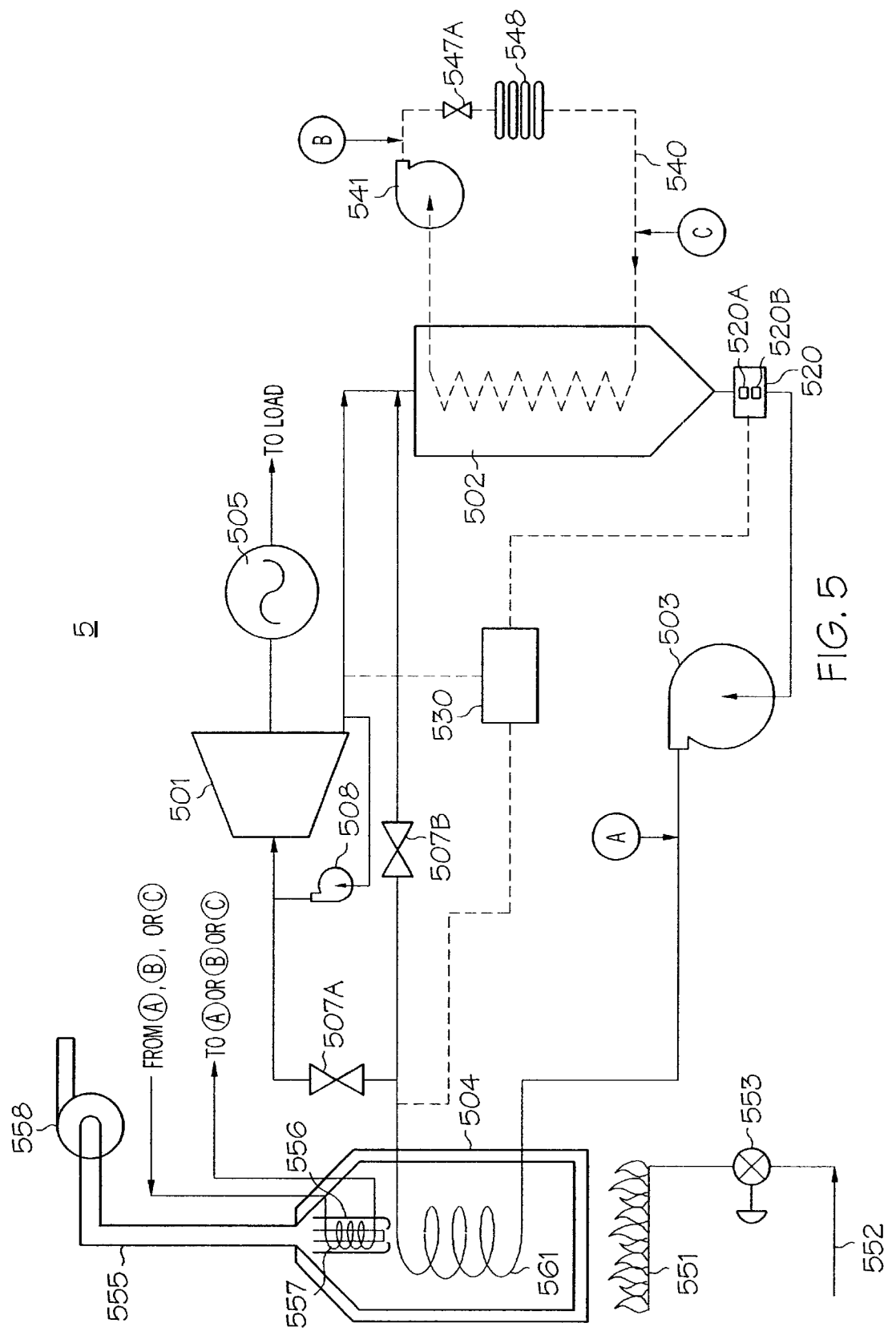
FIG. 5 shows a schematic diagram of an integrated micro-CHP showing a directly-fired configuration with no storage tank and SH capability.

Referring now to FIG. 5, a directly-fired micro-CHP system 5 is shown. This represents the most simplistic system, in that it is geared toward the exclusive generation of electricity and SH. By not including DHW capability, a storage tank can be avoided without sacrificing system functionality or requiring augmented burner capacity. In other respects, this system is similar to that of the previous directly-fired embodiments, including operation of the heat source componentry 551, 552 and 553, exhaust componentry 555, 556, 557 and 558, organic working fluid flow path componentry 501, 502, 503, 504, 507A,B and 508, generator 505, and sensing a controlling apparatus 520, 530.

Figure 6:
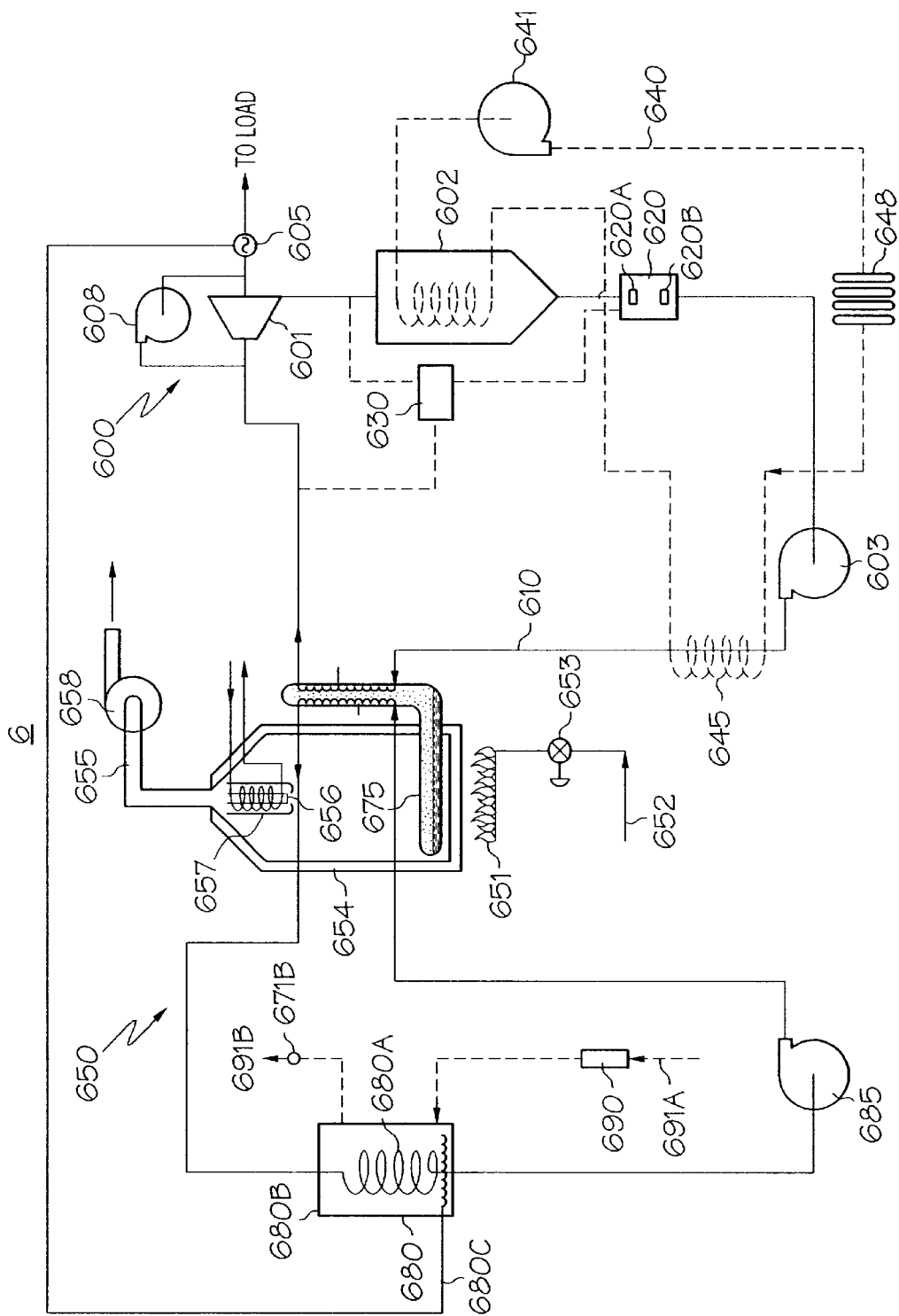
FIG. 6 shows the integration of a heat pipe into an indirectly-fired embodiment of the present invention, further highlighting a common heat exchanger for both SH and DHW.
Figure 7:
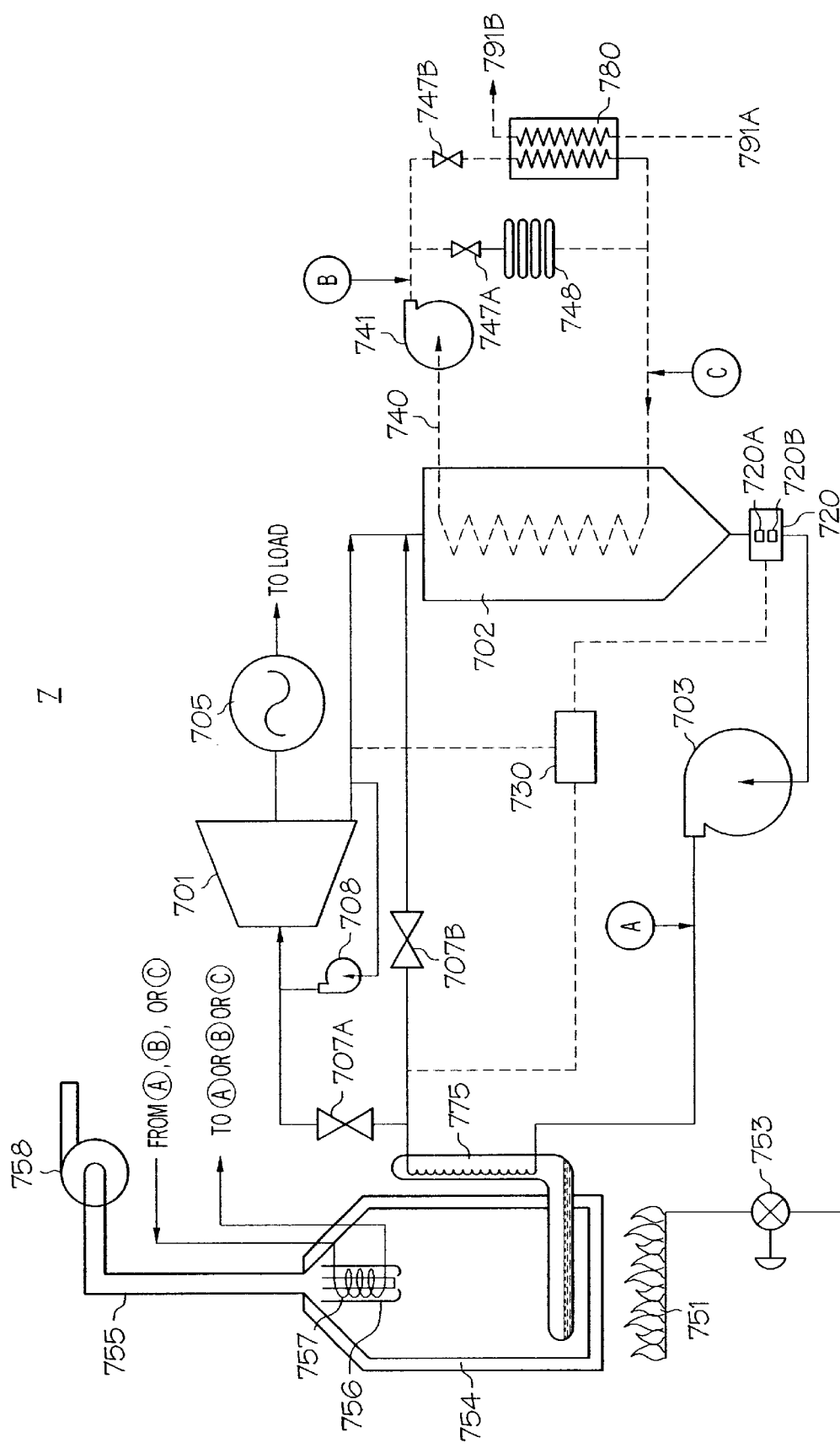
FIG. 7 shows the integration of a heat pipe into a directly-fired embodiment of the present invention, further highlighting a common heat exchanger for both SH and DHW.

Referring now to FIGS. 6 and 7, a variation on the indirectly-fired and directly-fired cogeneration systems of the previous aspects is shown. Referring with particularity to FIG. 6, a passive heat transfer element, preferably in the form of a heat pipe 675, can be disposed between the first circuit 600 and the second circuit 650 to effect heat exchange between those circuits and the heat source. Referring with particularity to FIG. 7, heat pipe 775 is disposed within the flow path of the first circuit, which also includes scroll expander 701, condenser 702 and pump 703. In either configuration, the heat pipe is an evacuated and sealed container that contains a small quantity of working fluid, such as water or methanol. When one end of the pipe (typically referred to as the evaporator end) is heated, the working fluid rapidly vaporizes, due in part to the low internal pressure of the fluid. The vapor travels to the lower-pressure opposite end (typically referred to as the condenser end), giving up its latent heat. Preferably, gravity or capillary action allows the condensed fluid to move back to the evaporator end, where the cycle can be repeated. When the fluid has a large heat of vaporization, a significant amount of heat can be transferred, even when the temperature differences between the opposing ends is not great. In other regards, the operation of the systems is similar to that of the previous aspects.

Referring now to FIG. 8, details of the exhaust duct heat exchanger 157 and the exhaust gas recirculation device 156 are shown. The combustion chamber 154 (not presently drawn to scale) encases enough of the heat source apparatus, including burner 151) to ensure that the exhaust gas and related combustion products are entrained into the exhaust duct 155 such that they can be vented to the atmosphere. An induced draft fan (shown elsewhere) can be used to ensure thorough venting of the combustion products. The exhaust gas recirculation device 156 is a co-annular duct that takes the exhaust gas leaving the region around burner 151 through the inner annulus 156A, and doubles back a portion of the gas to flow in the outer annulus 156B. During the time that the portion of the gas that is recirculating through the outer annulus 156B, it is giving up some of its heat to the exhaust duct heat exchanger 157, which is shown as a coiled conduit. From here, the coiled conduit of the heat exchanger 157 can be routed to other locations (shown elsewhere) in the system, where it can then be used to provide supplemental heat.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

We claim:

1. A cogeneration system configured to operate with an organic working fluid, said system comprising:
   a heat source;
   a first circuit configured to transport said organic working fluid, said first circuit in thermal communication with said heat source such that heat transferred therefrom superheats said organic working fluid, said first circuit comprising:
      a scroll expander configured to receive said organic working fluid such that said organic working fluid remains superheated after passage through said scroll expander;
      a condenser in fluid communication with said scroll expander; and
      a pump configured to circulate said organic working fluid through said first circuit; and
   a generator operatively coupled to said scroll expander to produce electricity.

2. A cogeneration system comprising:
   an organic working fluid;
   a heat source capable of superheating said organic working fluid;
   a first circuit configured to transport said organic working fluid, at least a portion of said first circuit in thermal communication with said heat source, said first circuit comprising:
      a scroll expander configured to receive said organic working fluid such that said organic working fluid remains superheated after passage through said scroll expander;
      a condenser in fluid communication with said scroll expander; and
      a pump configured to circulate said organic working fluid through said first circuit; and
   a generator operatively coupled to said scroll expander to produce electricity.

3. A cogeneration system according to claim 2, wherein said heat source is a burner in thermal communication with an evaporator.

4. A cogeneration system according to claim 3, wherein said burner and said evaporator are enclosed within a common container, said container including an exhaust duct.

5. A cogeneration system according to claim 4, further comprising a heat exchanger adjacent to said exhaust duct.

6. A cogeneration system according to claim 5, wherein said heat exchanger further comprises an exhaust gas recirculation device.

7. A cogeneration system according to claim 5, wherein a portion of the heat removed from said exhaust duct by said heat exchanger is placed in thermal communication with at least one circulating fluid, thereby increasing the temperature of said fluid.

8. A cogeneration system according to claim 3, wherein said thermal communication between said burner and said first circuit is through an interloop heat exchanger disposed between said pump and said scroll expander.

9. A cogeneration system according to claim 8, further comprising a second circuit disposed adjacent said burner, said second circuit including at least one piping loop adapted to convey a heat exchange fluid therethrough.

10. A cogeneration system according to claim 9, wherein said burner is contained within a combustion chamber that is in thermal communication with said second circuit, said combustion chamber including an exhaust duct in combustion communication with said burner.

11. A cogeneration system according to claim 10, further comprising an exhaust fan coupled to said exhaust duct to facilitate the removal of exhaust gas from said combustion chamber.

12. A cogeneration system according to claim 10, wherein said exhaust duct further comprises an exhaust gas recirculation device such that at least a portion of residual heat extant in said exhaust gas is transferred to said heat exchange fluid.

13. A cogeneration system according to claim 8, wherein said heat exchange fluid in said second circuit comprises a mixture of water and a freeze-inhibiting additive.

14. A cogeneration system according to claim 8, wherein said heat exchange fluid in said second circuit comprises an organic heat transfer fluid.

15. A cogeneration system according to claim 2, wherein said heat source and said first circuit are configured such that the maximum operating pressure of said organic working fluid within said first circuit is approximately 200 to 450 pounds per square inch, and the maximum operating temperature is approximately 250 to 350 degrees Fahrenheit.

16. A cogeneration system according to claim 2, wherein said organic working fluid comprises a halocarbon refrigerant.

17. A cogeneration system according to claim 16, wherein said halocarbon refrigerant comprises R-245fa.

18. A cogeneration system according to claim 2, wherein said working fluid comprises at least one naturally occurring hydrocarbon.

19. A cogeneration system according to claim 18, wherein said at least one naturally occurring hydrocarbon comprises the general formula $C_nH_{2n+2}$.

20. A cogeneration system according to claim 19, wherein said at least one naturally occurring hydrocarbon of the general formula $C_nH_{2n+2}$ comprises isopentane.

21. A cogeneration system according to claim 2, wherein said condenser is configured to be in heat exchange communication with a space heating loop.

22. A cogeneration system according to claim 21, further comprising a space heating loop preheat device placed in heat exchange communication with a second circuit adapted to convey a heat exchange fluid therethrough.

23. A cogeneration system according to claim 2, wherein said first circuit is configured such that electricity produced by said generator is up to 10 kilowatts.

24. A cogeneration system according to claim 2, wherein said system is configured such that a portion of said electricity produced by said generator is used to operate said pump.

25. A cogeneration system according to claim 2, wherein said condenser is capable of transferring up to 60 kilowatts of thermal energy.

26. A cogeneration system according to claim 2, further including a controller configured to monitor and selectively vary the extent to which said organic working fluid is superheated.

27. A cogeneration system according to claim 26, wherein said controller is configured to compare temperature signals in said evaporator and said scroll expander to determine the extent to which said organic working fluid is superheated.

28. A cogeneration system according to claim 27, further comprising at least one switch responsive to a level of said organic working fluid at the exit of said condenser, said at least one switch coupled to said controller.

29. A cogeneration system according to claim 26, further comprising a set of valves configured to permit said organic working fluid to bypass said scroll expander upon a preset condition.

30. A cogeneration system according to claim 29, wherein said preset condition is a grid outage.

31. A cogeneration system according to claim 29, wherein said preset condition is a startup transient.

32. A cogeneration system according to claim 29, wherein said preset condition is a shutdown transient.

33. A cogeneration system according to claim 2, wherein said cogeneration system is configured to be in heat exchange communication with a domestic hot water loop.

34. A cogeneration system according to claim 33, wherein said heat exchange communication between said cogeneration system and said domestic hot water loop occurs in a storage tank disposed within a second circuit, and wherein said second circuit is adapted to convey a heat exchange fluid therethrough.

35. A cogeneration system according to claim 34, further comprising a heating element disposed in said water storage tank, said heating element is heated by electricity provided by said generator.

36. A cogeneration system according to claim 33, wherein said heat exchange communication between said cogeneration system and said domestic hot water loop occurs in said condenser.

37. A directly-fired micro combined heat and power system comprising:
    an organic working fluid;
    a piping loop that defines an organic working fluid flow path;
    an evaporator disposed in said organic working fluid flow path;
    a burner in thermal communication with said evaporator such that heat transferred thereto superheats said organic working fluid;
    a scroll expander disposed in said organic working fluid flow path such that said superheated organic working fluid passing through said scroll expander remains superheated upon discharge from said scroll expander;
    a generator operatively responsive to said scroll expander to generate electricity;
    a condenser comprising:
        a primary loop disposed in said organic working fluid flow path such that said primary loop is in fluid communication with said scroll expander; and
        a secondary loop in heat exchange relationship with said primary loop, said secondary loop configured to transfer at least a portion of the heat contained in said organic working fluid passing through said primary loop to a space heating device; and
    a pump disposed in said organic working fluid flow path between said condenser and said evaporator.

38. A directly-fired micro combined heat and power system according to claim 37, further including a controller configured to monitor and selectively vary the extent to which said organic working fluid is superheated.

39. A directly-fired micro combined heat and power system according to claim 38, further comprising at least one switch responsive to a level of said organic working fluid at the exit of said condenser, said at least one switch coupled to said controller.

40. A directly-fired micro combined heat and power system according to claim 38, further comprising a set of valves configured to permit said organic working fluid bypass said scroll expander if said controller detects a grid outage.

41. A directly-fired micro combined heat and power system according to claim 37, wherein said burner and said evaporator are enclosed within a common container, said container including an exhaust duct.

42. A directly-fired micro combined heat and power system according to claim 41, wherein said secondary loop is bifurcated such that one path is configured to connect to a space heating loop, while the other path is configured to connect to a domestic hot water loop.

43. A directly-fired micro combined heat and power system according to claim 42, wherein at least one place in said secondary loop is in thermal communication with said heat exchanger disposed adjacent said exhaust duct.

44. A directly-fired micro combined heat and power system according to claim 37, further comprising a heat exchanger disposed in said exhaust duct.

45. A directly-fired micro combined heat and power system according to claim 37, wherein said heat exchanger further comprises an exhaust gas recirculation device.

46. A directly-fired micro combined heat and power system according to claim 37, wherein said burner is sized to provide additional heat to said secondary loop.

47. A directly-fired micro combined heat and power system according to claim 37, wherein said secondary loop of said condenser is further configured to couple to a water storage tank.

48. A directly-fired micro combined heat and power system according to claim 47, further comprising a connection in electrical communication with said generator, said connection adapted to connect to a heating element in said water storage tank.

49. A directly-fired micro combined heat and power system according to claim 47, wherein said condenser is configured to convey up to 60 kilowatts of heat to said secondary loop.

50. A directly-fired micro combined heat and power system according to claim 47, wherein said secondary loop is configured to circulate a hydronic fluid.

51. A directly-fired micro combined heat and power system according to claim 37, wherein said organic working fluid comprises a halocarbon refrigerant.

52. A directly-fired micro combined heat and power system according to claim 51, wherein said halocarbon refrigerant comprises R-245fa.

53. A directly-fired micro combined heat and power system according to claim 37, wherein said working fluid comprises at least one naturally-occurring hydrocarbon.

54. A directly-fired micro combined heat and power system according to claim 53, wherein said at least one naturally occurring hydrocarbon comprises the general formula $C_nH_{2n+2}$.

55. A directly-fired micro combined heat and power system according to claim 54, wherein said at least one naturally occurring hydrocarbon of the general formula $C_nH_{2n+2}$ comprises isopentane.

56. A micro combined heat and power system comprising:
an electricity generating loop comprising:
an organic working fluid;
a burner for superheating said organic working fluid;
a scroll expander to receive said organic working fluid, said scroll expander configured to leave said organic working fluid in a superheated state after passing therethrough;
a generator operatively coupled to said scroll expander to produce electricity;
a condenser disposed in fluid communication with said scroll expander; and
a pump to circulate said organic working fluid through said electricity generating loop; and
a connection in said condenser, said connection configured to couple to an external heating loop.

57. A micro combined heat and power system according to claim 56, wherein said external heating loop is a space heating loop.

58. A micro combined heat and power system according to claim 56, wherein said external heating loop a domestic hot water loop.

59. A micro combined heat and power system according to claim 56, wherein said external heating loop comprises a domestic hot water loop and a space heating loop.

60. A micro combined heat and power system according to claim 56, further comprising a second circuit in thermal communication with said burner.

61. A micro combined heat and power system according to claim 60, wherein said second circuit is adapted to convey a heat exchange fluid therethrough.

62. A micro combined heat and power system according to claim 61, further comprising a preheat coil coupled to said condenser and in thermal communication with said burner such that a fluid flowing through said preheat coil can be preheated prior to entry into said condenser.

63. A micro combined heat and power system according to claim 61, further comprising a controller in signal communication with said electricity generating loop to monitor and selectively vary the energy content of said organic working fluid.

64. A micro combined heat and power system according to claim 56, wherein said burner is disposed in a combustion chamber, said combustion chamber disposed in a second circuit to circulate a secondary fluid therethrough, said combustion chamber comprising:
an exhaust duct in combustion communication with said burner;
a secondary fluid flow path disposed adjacent said burner; and
an exhaust gas recirculation duct in fluid communication with said burner.

65. A micro combined heat and power system according to claim 64, further comprising an exhaust fan coupled to said exhaust duct to facilitate the removal of exhaust gas from said combustion chamber.

66. A micro combined heat and power system according to claim 58, further comprising a coupling loop to facilitate thermal communication between said electricity generating loop and said domestic hot water loop, said coupling loop comprising:
a circulating fluid flow path;
a combustion chamber disposed in said working fluid flow path, said combustion chamber comprising:
a burner in thermal communication with said heat source such that the temperature of said organic working fluid in said organic working fluid flow path is raised;
an exhaust duct in combustion communication with said burner;
an exhaust fan coupled to said exhaust duct to facilitate the removal of exhaust gas from said combustion chamber; and
an exhaust gas recirculation duct in fluid communication with said burner; and
a thermal interface with said at least one heat exchanger disposed in said domestic hot water loop such that a least a portion of the heat extant in working fluid flowing through said working fluid flow path is transferred to domestic hot water flowing through said domestic hot water loop.

67. A system for the production of domestic hot water, space heat and electricity from a Rankine-based cycle, said system comprising:
an organic working fluid;
a substantially closed circuit fluid path configured to transport said organic working fluid therethrough, said substantially closed circuit fluid path at least partially defined by conduit configured to act as a heat transfer element for said organic working fluid, said substantially closed circuit fluid path comprising:
a scroll expander configured to accept said organic working fluid such that said organic working fluid remains superheated after passage through said scroll expander;
a generator operatively coupled to said scroll expander to generate electricity;

a condenser configured to extract at least a portion of the heat remaining in said organic working fluid after said organic working fluid passes through said scroll expander; and a pump capable of circulating said organic working fluid through said substantially closed circuit fluid path;

a burner in thermal communication with said conduit, said burner configured to provide sufficient heat to superheat said organic working fluid; and a controller to regulate the operation of said system.

68. A system according to claim 67, wherein said condenser is configured such that an external heating fluid path could be placed in thermal communication therewith.

69. A system according to claim 68, wherein said condenser is configured to extract up to 60 kilowatts of thermal energy from said organic working fluid.

70. A system according to claim 67, wherein said pump is powered by a portion of said electricity produced in said generator.

71. A system according to claim 67, wherein said electrical output of said generator is up to 10 kilowatts.

72. A system according to claim 67, wherein a preferred heat to power ratio extracted from said system during normal operation is between about 7:1 and 11:1.

73. A method of producing heat and electrical power from a cogeneration device, the method comprising the steps of:

configuring a first circuit to transport an organic working fluid;

superheating said organic working fluid with a heat source that is in thermal communication with said first circuit;

expanding said superheated organic working fluid in a scroll expander;

maintaining said organic working fluid in a superheated state through said expanding step;

turning a generator that is coupled to said scroll expander to generate electricity;

cooling said organic working fluid in a condenser such that at least a portion of the heat in said organic working fluid passing through said condenser is transferred to an external heating loop;

using at least a portion of said heat that has been transferred to said external heating loop heat to provide space heat; and returning said organic working fluid exiting said condenser to a position in said first circuit such that it can receive additional heat input from said heat source.

74. A method according to claim 73, comprising the additional step of selectively using at least a portion of said heat that has been transferred to said external heating loop to heat a domestic hot water loop.

75. A method according to claim 74, comprising the additional steps of:

configuring a second circuit to transport a heat exchange fluid, said second circuit defined by a piping loop in thermal communication with said heat source and heat exchange communication with at least one domestic hot water loop;

heating said heat exchange fluid with said heat source; and using at least a portion of said heat that has been transferred to said heating exchange fluid to heat a fluid in said domestic hot water loop.

76. A method according to claim 69, wherein said organic working fluid is superheated to about 10 to 30 degrees Fahrenheit above its boiling point in said superheating step.

77. A method according to claim 69, wherein said returning step pressurizes said organic working fluid to a maximum pressure of about 200 to 450 pounds per square inch.

78. A method according to claim 73, wherein said superheating step produces a maximum temperature of said organic working fluid between about 250 to 350 degrees Fahrenheit.

79. A method according to claim 73, wherein said expanding step is conducted such that the electrical output of said generator is up to 10 kilowatts.

80. A method according to claim 73, wherein said cooling step is conducted such that the thermal output transferred to said external heating loop is up to 60 kilowatts.

81. A method according to claim 73, wherein said superheating step is conducted such that said organic working fluid is directly fired with said heat source.

82. A method according to claim 73, wherein said superheating step is conducted such that said organic working fluid is indirectly fired with said heat source.

83. A method according to claim 73, comprising the additional step of operating a set of valves configured to permit said organic working fluid to bypass said scroll expander upon a preset condition.

84. A method according to claim 83, wherein said preset condition is a grid outage.

85. A method according to claim 83, wherein said preset condition is a startup transient.

86. A method according to claim 83, wherein said preset condition is a shutdown transient.

87. A system for the production of electricity and space heat, said system comprising:

an organic working fluid;

a flow path configured to transport said organic working fluid;

a combustion chamber disposed in said flow path, said combustion chamber comprising:

a burner;

a heat transfer element adapted to convey said organic working fluid adjacent said burner such that upon operation of said burner, said organic working fluid becomes superheated; and an exhaust duct to convey combustion products produced by said burner to the atmosphere;

a scroll expander disposed in said flow path to receive and discharge said organic working fluid such that said organic working fluid remains superheated after passage through said scroll expander;

a generator operatively coupled to said scroll expander to produce electricity;

a condenser in fluid communication with said scroll expander; and a pump to circulate said organic working fluid through said flow path.

88. A system according to claim 87, further comprising at least one connection in said condenser, said connection configured to place a space heating loop in thermal communication with said organic working fluid.

89. A system according to claim 88, further comprising:

a controller configured to monitor and selectively vary the extent to which said organic working fluid is superheated;

at least one switch responsive to a level of said organic working fluid at the exit of said condenser, said at least one switch coupled to said controller; and a set of valves configured to permit said organic working fluid to bypass said scroll expander upon a preset condition.

90. A system according to claim 88, further comprising a heat exchanger adjacent said exhaust duct.

91. A system according to claim 90, wherein said heat exchanger further comprises an exhaust gas recirculation device.

92. A system according to claim 90, further comprising a supplemental heat device placed in heat exchange communication with said heat exchanger, said supplemental heat device configured to increase the fluid temperature in at least one of said organic working fluid flow path or said space heating loop.

* * * * *